United States Patent
Bshara et al.

(10) Patent No.: US 10,284,460 B1
(45) Date of Patent: May 7, 2019

(54) NETWORK PACKET TRACING

(71) Applicant: Amazon Technologies, Inc., Seattle, WA (US)

(72) Inventors: Nafea Bshara, San Jose, CA (US); Leonard Thomas Tracy, Bothell, WA (US); Thomas A. Volpe, Austin, TX (US); Mark Bradley Davis, Austin, TX (US); Mark Noel Kelly, Seattle, WA (US); Stephen Callaghan, Seattle, WA (US); Justin Oliver Pietsch, Bothell, WA (US); Edward Crabbe, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 172 days.

(21) Appl. No.: 14/981,013

(22) Filed: Dec. 28, 2015

(51) Int. Cl.
*H04L 12/721* (2013.01)
*H04L 12/26* (2006.01)

(52) U.S. Cl.
CPC .......... *H04L 45/26* (2013.01); *H04L 43/0876* (2013.01)

(58) Field of Classification Search
CPC ...... H04L 43/50; H04L 45/26; H04L 43/0876
See application file for complete search history.

(56) References Cited

U.S. PATENT DOCUMENTS

| 6,954,789 | B2 | 10/2005 | Dietz et al. | |
|---|---|---|---|---|
| 6,978,223 | B2 | 12/2005 | Milliken | |
| 7,688,727 | B1 | 3/2010 | Ferguson et al. | |
| 8,098,579 | B2 | 1/2012 | Ray et al. | |
| 8,199,653 | B2 | 6/2012 | Bugenhagen et al. | |
| 2003/0161265 | A1* | 8/2003 | Cao | H04L 43/50 370/229 |
| 2008/0037518 | A1* | 2/2008 | Kumarasamy | H04L 65/1069 370/352 |
| 2008/0212484 | A1* | 9/2008 | Kaminsky | H04L 41/12 370/248 |
| 2008/0253299 | A1* | 10/2008 | Damm | H04L 43/50 370/252 |
| 2011/0063988 | A1* | 3/2011 | Lee | H04L 41/5009 370/252 |
| 2014/0301213 | A1* | 10/2014 | Khanal | H04L 43/04 370/248 |
| 2015/0215206 | A1* | 7/2015 | Solis | H04L 45/742 370/252 |
| 2017/0180235 | A1* | 6/2017 | Zak | H04L 43/106 |
| 2017/0187587 | A1* | 6/2017 | Keppel | H04L 43/062 |

* cited by examiner

*Primary Examiner* — Khaled M Kassim
(74) *Attorney, Agent, or Firm* — Robert C. Kowert; Meyertons, Hood, Kivlin, Kowert & Goetzel, P.C.

(57) ABSTRACT

Network packet tracing may be implemented on packet processors or other devices that perform packet processing. As network packets are received, a determination may be made as to whether tracing is enabled for the network packets. For those network packets with tracing enabled, trace information may be generated and the network packets modified to include the trace information such that forwarding decisions for the network packets ignore the trace information. Trace information indicate a packet processor as a location in a route traversed by the network packets and may include ingress and egress timestamps. Forwarding decisions may then be made and the network packets sent according to the forwarding decisions. Tracing may be enabled or disabled by packet processors for individual network packets. Trace information may also be truncated at a packet processor.

23 Claims, 8 Drawing Sheets

NETWORK PACKET TRACING

BACKGROUND

Network communications are foundational to the operation of many different systems and devices. Large public networks, such as the Internet, or smaller private networks, such as corporate intranets, facilitate communications between different systems or devices, from clients of services that provide storage, computing, or data delivery to hosting internal web sites or network tools accessible to a small number of users. Such networks utilize large numbers of networking devices to facilitate the fast and reliable delivery of data, including network packets, from one system to another.

Leveraging the power of network communications has greatly increased the demand upon networking devices to receive, process, and send network packets. However, this increased demand leads to a greater need for effective diagnostic, monitoring, and corrective tools to repair or improve the performance of networking devices in a network. For example, route information that traces the journey of a network packet from one networking device to another across the network may be used to identify those networking devices within a network that may not be performing optimally. Other packet processing performance metrics that indicate the latency network packets experience at a particular networking device or the workload that networking devices handle may provide insight into the performance of the network to transmit network communications.

Figure 1:
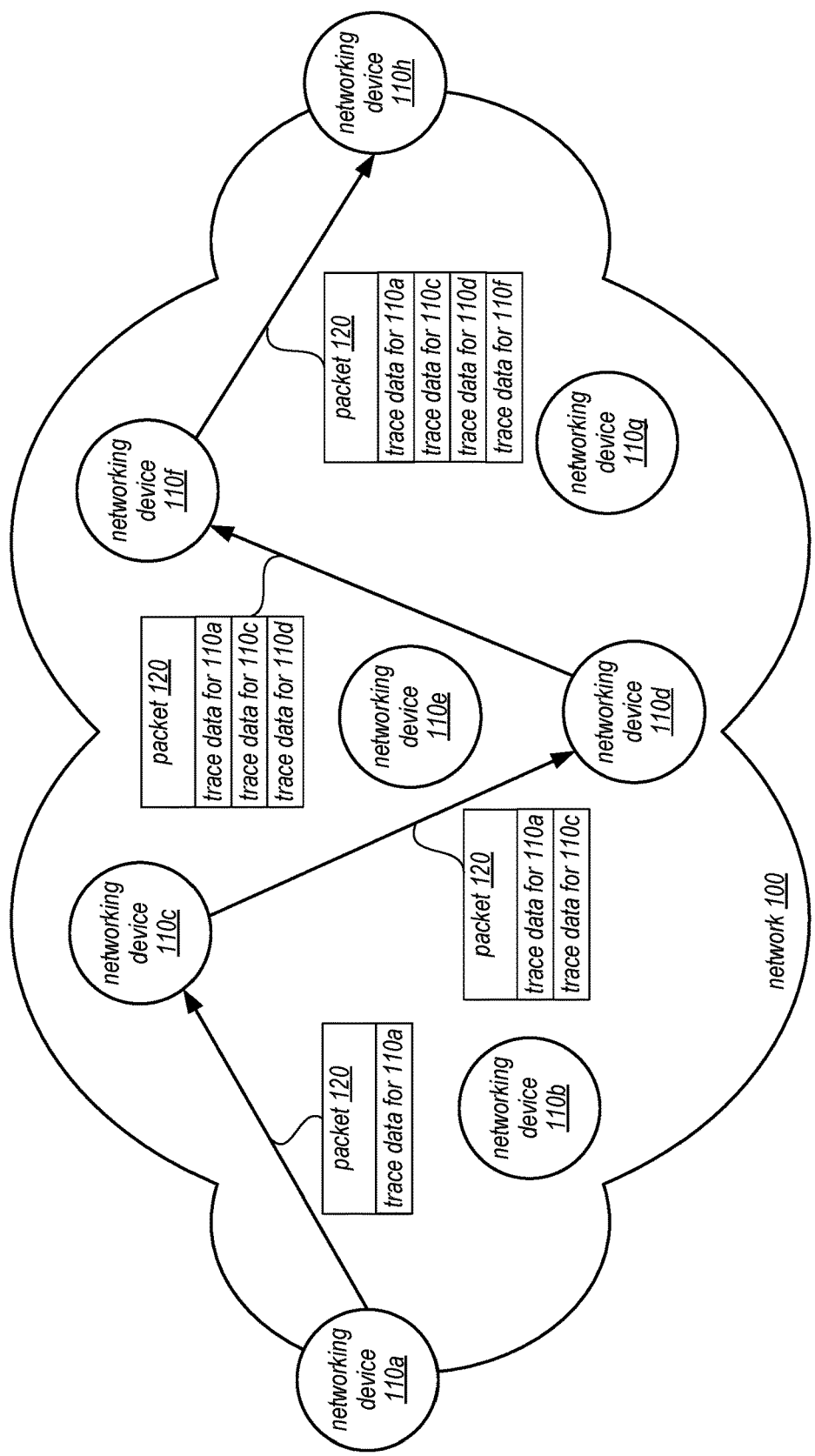
FIG. 1 illustrates a logical block diagram of a network that implements network packet tracing at networking devices implemented as part of the network, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described herein may implement network packet tracing for network packets without disrupting the processing or progress of the network packets.

Network packets are packets of data (e.g., datagrams) sent across a network from a source networking device (e.g., a network interface card implemented at a computer or server) to a destination networking device. The network may include many other networking devices, such as various kinds of switches, routers, network bricks, or any other device capable of receiving, processing, and/or sending the network packets across links between the networking devices in the network.

The path or route which a network packet travels may be determined according to forwarding decisions made at various networking devices in a network. A switch, for instance, may receive a network packet and make forwarding decisions with respect to the content of information in the network packet, such as various packet header fields. Once a forwarding decision is made, modifications to the packet may or may not be performed, and the packet sent to a next networking device connected to the current networking device (or the networking packet may be dropped). Forwarding of the network packet may continue amongst the networking devices of a network until the network packet reaches the desired destination.

Because many networking devices may forward a network packet sent until the destination is reached, the overall time for a network packet to reach the destination from the source may be dependent on the individual performances of the many different networking devices. A problem or failure at one of the networking devices in the route to a destination may slow the progress of network packets (or lose the network packets completely). Locating a problematic networking device, however, is difficult. The route that a network packet takes from the source to the destination is not typically known. For instance, a packet may traverse multiple networks, from private to public and public to private, which are not under the control of any one entity. Additionally, the way in which packets are routed to a destination may be changed within these networks. Such variables make it difficult to identify problems in the transmission of network packets over a network.

While some attempts to discover information about the routes of network packets have been made, such attempts rely upon utilizing software mechanisms to probe the different networking devices that might receive a network packet directed from a particular source to a particular destination. However, probing techniques do not necessarily identify the same route that network packets take. For instance, multiple different routes may be utilized for different network packets sent from the same source to reach the same destination. Other tracing attempts rely upon the intervention of specialized software at different networking devices to insert trace information. However, such attempts typically disrupt the sending, processing, and receiving of network packets, resulting in delayed processing (e.g., due to the time the specialized software requires to access and insert trace information) or lost/dropped packets (e.g., due to packet insertions that disrupt or change the processing of network packets such that processing of the network packet cannot continue).

Various embodiments may implement network packet tracing at networking devices that does not disrupt or change the processing of network packets. Networking devices may modify network packets utilizing only the packet processing pipeline, without intervention by an external mechanism (e.g., a software controller executing on a processor), to include trace information that indicates a networking device as a location along a route at which the network packet was processed. The modification to the network packet may be performed such that other processing, like forwarding decision processing, may ignore, be unware of, or agnostic to the included trace information. Moreover, the modification may be performed such that the originally received network packet remains unchanged (e.g., the payload of data transmitted as part of the packet is not modified in any way).

Other information may be included as part of trace information. For example, ingress and egress timestamps may be included in some embodiments, which can be used to determine the time to process the network packet at the networking device. In this way the delay or latency in transmitting the network packet can be determined for the networking device. In some embodiments, as multiple network packets with trace information including timestamps are collected along a route or for a networking device, the latency jitter for the route or networking device can be determined. Trace information may also include information about the networking device itself, such as the state of buffers, queues, or other components which may indicate the load or amount of traffic handled at the networking device.

FIG. 1 illustrates a logical block diagram of a network that implements network packet tracing at networking devices implemented as part of the network, according to some embodiments. Network 100 may encompass any suitable combination of networking hardware and protocols necessary to establish network-based communications between different systems and devices. For example, a network may generally encompass the various telecommunications networks and service providers that collectively implement the Internet. Network 100 may also be or include one or multiple private networks such as local area networks (LANs) or wide area networks (WANs) as well as public or private wireless networks. In at least some embodiments, network 100 may be implemented as part of a provider network.

A provider network may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network. For example, a provider network may provide computing resources, such as a virtual computing service, storage services, such as a block-based storage service, relational or non-relational database services, and/or a data warehouse service, other processing services, and/or any other type of network based services. Clients of a provider network may access these various services offered by a provider network via a connection to the provider network (e.g., by connecting one or multiple computing devices to resources by transmitting network packets to different locations within network 100). In some embodiments, resources allocated to or utilized by clients of a provider network may direct network packets from one location in a network 100 to another location in network 100. Network packet tracing may be implemented for network packets transmitted on behalf of clients/customers within network 100 (e.g., to track the route and determine performance of the network packets for a client). In at least some embodiments, a client may submit a request, such as an API request to the provider network to enable network packet tracing for client traffic.

As illustrated in FIG. 1, multiple networking devices 110 (e.g., networking devices 110a, 110b, 110c, 110d, 110e, 110f, 110g, and 110h) are implemented as part of network 100 to transmit network packets across network 100. Networking devices may be various kinds of switches, routers, network bricks, network interface cards/controllers, or any other device capable of receiving, processing, and/or sending the network packets across links between the networking devices in the network. As discussed below with regard to FIG. 2, a networking device may include one or multiple packet processors or packet processing pipelines, each of which may independently initiate, insert, or remove packet trace information as described herein.

Tracing may be enabled for a network packet when the network packet reaches a certain location in network 100 (e.g., at an edge router) or is created and sent (e.g., from a client or server). The network packet may be marked, formatted, or modified to include an indication that tracing is enabled for the network packet, such as by setting a bit in reserved fields of a packet header. In some embodiments, tracing may be enabled for networking packets in order to provide trace information for particular packets (e.g., network packets for a particular client, customer, path, or port). Tracing may also be enabled so that trace information is enabled for a random or statistical sampling of network packets. For instance, a random number generator or other selection engine may be implemented to select network packets to enable tracing along with tracking the identity of those network packets for which network packet tracing is enabled.

Once enabled, a networking device that receives the packet may be able to detect that tracing is enabled for the packet in hardware by evaluating the network packet. For example, a network packet 120 may be received at networking device 110a which has a particular reserved bit set in the Internet Protocol (IP) header of the packet. In some embodiments, networking devices may be configured such that if tracing is detected as enabled for a network packet, the networking devices are required to include trace information in the network packet. In this way, networking devices may not overrule, ignore, disable, or discontinue network packet tracing for other reasons. Networking device 110a may be configured to detect that the reserved bit is set and modify the network packet 120 to include trace information that indicates that networking device 110a (or a particular component of networking device 110a, such as particular switch implemented as part of networking device 110a) processed the packet. Other trace information, as discussed above may also be included (e.g., latency information, such as ingress/egress timestamps, or workload information for the networking device, such as buffer queue depth).

A forwarding decision may be made to send the packet 120. For example, the forwarding decision may be made to send the network packet to networking device 110c. Note that the inclusion of tracing data for networking device 110a does not affect the decision to forward the network packet to networking device 110c. For example, the modification of the network packet may be made so that different lookup operations, to a next hop table for instance, are not affected and would result in the same next hop address being determined for the network packet as if the trace information were not included. Nor would inclusion of the trace information affect subsequent forwarding decisions made at other networking devices. As illustrated in FIG. 1, network packet 120 is sent with trace data to networking device 110c, which again may determine that tracing is enabled for network packet 120. Trace data for networking device 110c may be included in network packet 120 which may be sent to networking device 110d in accordance with a forwarding decision made at networking device 110c. Each networking device that is configured to implement network packet tracing may detect and include tracing data for network packet 120 (e.g., trace information for networking device 110f and 110h).

In some embodiments, trace information may be included at each network hop or networking device until a network packet reaches the desired destination (e.g., a server or client device). In some embodiments, tracing may be disabled and trace information removed once a network packet reaches a network boundary, such as an edge server for a network. The last networking device that processes the network packet with tracing enabled may capture or provide the trace information included in the network packet by other networking devices to be parsed or analyzed. For instance, networking device 110h may be an edge router that traps or logs a copy of network packet 120 in order to provide the trace information included in network packet 120 to a monitoring system or other component that removes the trace information from network packet 120 for analysis. In at least some embodiments, the hardware of the networking device itself may strip the trace may strip or remove trace information from network packet 120 and provide it to another component for analysis (e.g., a switch or other packet processor may modify the network packet to remove the trace information utilizing dedicated circuitry before sending, dropping, or accepting the packet). In addition to getting trace information from the network packet, various network packet characteristics may be determined (e.g., information from packet headers or evaluations of the network packet to calculate information such as packet length).

In addition to enabling tracing for network packets, disabling tracing for network packets, modifying network packets to including trace information, and removing trace information from network packets, in some embodiments, networking devices may handle enforce certain tracing limitations. For example, it may be that a network packet with tracing enabled travels a large number of network hops to reach a location before tracing is disabled and trace information collected. The space required to store trace information for the large number of networking devices may exceed the space available to prevent forwarding decisions from being changed (or errors occurring). Thus, trace information may be truncated so that tracing is disabled when no more room is available for storing trace information. In this way the already included trace information is preserved without causing the network packet to drop as a result of error or otherwise change a forwarding decisions made for the network packet.

The trace information collected for a network packet may be utilized in different ways by one or more multiple entities. For instance, an entity that operates a network, such as network 100, may collect tracing data for network packets that travel in and through networking devices 110 in order to monitor the performance of network 100. Timestamps, for network packets that pass through a particular networking device may be analyzed to determine how quickly different networking devices are processing packets. Recipients or senders of network packets may also utilize trace information included in network packets. For instance, it may be beneficial for a client of a network application or service to understand the route that network packets take between the client and the service. The trace information may be included along the route between network packets sent from the application or service to the client (or vice versa if the application or service captures trace information in packets received from the client and provides it to the client).

Many different configurations of networks or networking devices may be implemented to perform network packet tracing. Therefore, please note that the previous descriptions are not intended to be limiting, but are merely provided as a logical example of a network, networking devices, packet routes, or trace information. For example, in some embodiments, not all networking devices in a network may be capable of including trace information. Such networking devices may be unaware of the trace information included in a network packet or that tracing has been enabled for the network packet and may perform normal forwarding decisions without interference from the trace information, effectively skipping tracing for an individual networking device. Consider an example where networking device 110*d* received packet 120 but was not configured to perform tracing. Networking device 110*d* would still be able to determine that networking device 110*f* was the next hop for packet 120 and send the packet 120 to networking device 110*f* without including trace information for packet 120 (and also without removing trace information for networking devices 110*a* and 110*c*).

This specification begins with a general description of a networking device, which may implement network packet tracing as part of packet processing at a packet processor. Then various examples of a packet processor are discussed, including different components/modules, or arrangements of components/modules that may be implemented and which may detect that tracing is enabled for network packets, modify network packets to include trace information, capture trace information in network packets, and/or disable tracing for network packets. A number of different methods and techniques to implement network packet tracing are then discussed, some of which are illustrated in accompanying flowcharts. Various examples are provided throughout the specification.

Figure 2:
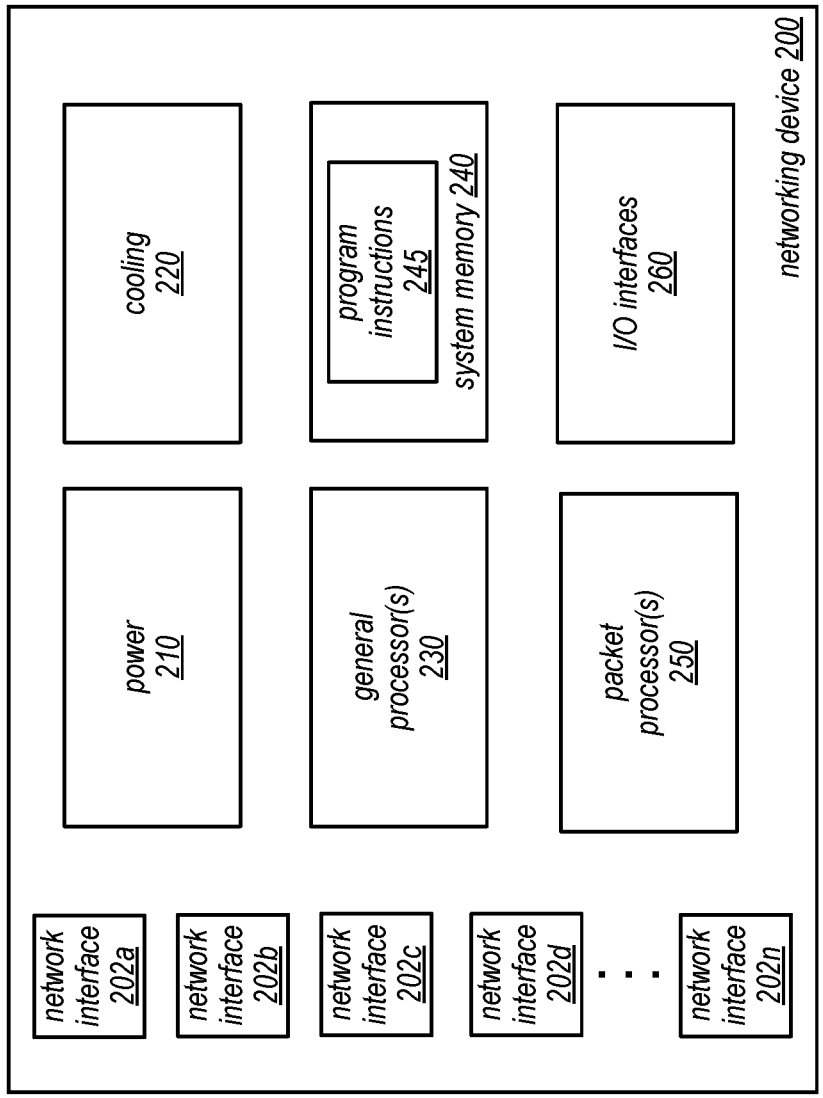
FIG. 2 is a logical block diagram illustrating a networking device that implements a packet processor, according to some embodiments.

FIG. 2 is a logical block diagram illustrating a networking device that implements a packet processor, according to some embodiments. Networking device 200 may be a networking device configured to route, forward, or otherwise facilitate the communication of different devices, systems or networks via network connections to the networking device. A networking device may provide electrical and logical network connections. Networking devices may operate utilizing data included in different OSI layers, such as layers 2 and 3 to make forwarding determinations (e.g., to send a network packet received from one source connected to the switch to another source connected to the switch). Please note that networking devices, such as a switch, in some contexts (e.g., when discussing layer 3 data) may be considered a type of router. Networking devices may also provide other services when facilitating communications, such as implementing network firewalls, network intrusion detection, and/or collecting metrics for performance analysis.

In at least some embodiments, networking device 200 may implement multiple network interfaces 202, which correspond to physical connections of different communication lines (e.g., twisted pair cables, coaxial cables, or fiber optic cables) connected to corresponding network interface ports. Network interfaces 202 may provide for different types, speeds, or other formats of network communication. For example, network interfaces 202 may provide different ports for 10 Gigabit, 40 Gigabit, or 100 Gigabit Ethernet cables. Many ports support multiple speeds, such as both 10 Gigabit and 100 Gigabit Ethernet connections.

Power 210 may be one or more power supplies that provide electricity to the various electrical components that draw upon power to perform operations (e.g., cooling 220, general processor(s) 230, system memory 240, packet processor(s) 250, and/or I/O interfaces 260. Cooling 220 may be one or more fan units implemented to circulate air and draw heat out of networking device 200.

Networking device 200 may include general processor(s) 230 which may include multiple cores (and which may be single or multi-threaded) coupled to a system memory 240 via an input/output (I/O) interface 260. Networking device 200 may be a uniprocessor system including one processor 230, or a multiprocessor system including several processors 230 (e.g., two, four, eight, or another suitable number). General processors 230 may be any suitable processors capable of executing instructions. For example, in various embodiments, processors 230 may be general-purpose or embedded processors implementing any of a variety of instruction set architectures (ISAs), such as the x86, PowerPC, SPARC, or MIPS ISAs, or any other suitable ISA. In multiprocessor systems, each of processors 230 may commonly, but not necessarily, implement the same ISA.

Networking device 200 includes one or more system memories 240 that are configured to store program instructions and data accessible by processor(s) 230. In various embodiments, system memories 240 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 240 may contain program instructions 245 that are executable by processor(s) 230 to implement various management functions and interfaces for networking device 200. In various embodiments, program instructions 245 may be encoded in platform native binary, any interpreted language such as Java™ byte-code, or in any other language such as C/C++, Java™, etc., or in any combination thereof.

In some embodiments, program instructions 245 may include instructions executable to implement an operating system (not shown), which may be any of various operating systems, custom or off the shelf operating systems. Any or all of program instructions 245 may be provided as a computer program product, or software, that may include a non-transitory computer-readable storage medium having stored thereon instructions, which may be used to program a computer system (or other electronic devices) to perform a process according to various embodiments. Program instructions 245 may also implement a controller that is configured to interface with packet processor(s) 250. For example, a controller may be configured to program memory devices with new or additional information (e.g., update next hop tables, action tables, etc.). Additionally, a controller may be able to access network packets trapped or logged by a packet processor 250 for further analysis and direct processing actions to be performed by packet processor 250 for the network packet. In at least some embodiments, a controller may be able to extract trace information from a network packet and provide the trace information for analysis (e.g., to another application executing on processor(s) 230 or sending the trace information over a network connection to a different system for analysis).

A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system via an I/O interface. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system as system memory or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface.

Networking device 200 may implement one or multiple I/O interface(s) 260 to provide access to networking device 200 (e.g., to perform various switch management operations). In one embodiment, I/O interfaces 260 may be configured to coordinate I/O traffic between processor 230, system memory 245, packet processor(s) 250, and any peripheral devices in the system. In some embodiments, I/O interfaces 260 may perform any necessary protocol, timing or other data transformations to convert data signals from one component (e.g., system memory 245) into a format suitable for use by another component (e.g., processor 230). In some embodiments, I/O interfaces 260 may include support for devices attached through various types of peripheral buses, such as a variant of the Peripheral Component Interconnect (PCI) bus standard or the Universal Serial Bus (USB) standard, for example. In some embodiments, the functions of I/O interfaces 260 may be split into two or more separate components, such as a north bridge and a south bridge, for example. Also, in some embodiments, some or all of the functionality of I/O interfaces 260, such as an interface to system memory 240, may be incorporated directly into processors 230.

Figure 3:
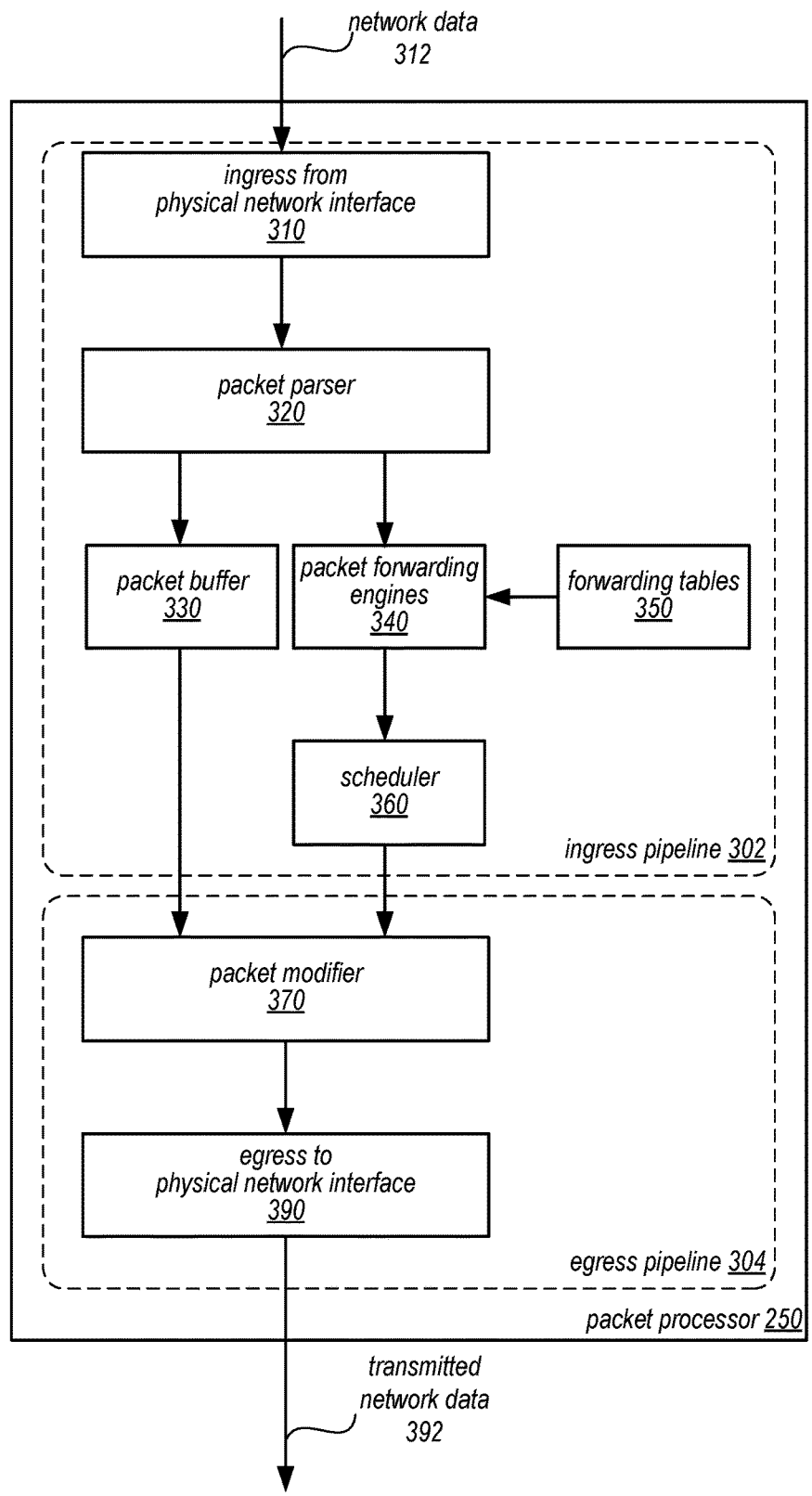
FIG. 3 is a logical block diagram illustrating a packet processor that performs network packet tracing, according to some embodiments.

As noted in FIG. 2, one or more multiple packet processors 250 may be implemented to process data received via network interface(s) 202 at networking device 200. Packet processor(s) 250 may be implemented as dedicated hardware to perform various stages of packet processing for networking device 200. For example, packet processor(s) 250 may be implemented as an application specific integrated circuit (ASIC), field programmable gate array (FPGA), system-on-chip (SOC), or other dedicated circuitry that performs packet processing. Packet processor(s) 250 may also be implemented as a software-based packet processing pipeline to perform various stages of packet processing for networking device 200 (e.g., via program instructions executing on one or more general processors 230). Packet processor(s) 250 may be assigned to one or multiple network interface(s) 202, performing dedicated processing of network data received via the assigned network interface(s) 202. FIG. 3 is a logical block diagram illustrating a packet processor that performs network packet tracing, according to some embodiments. Note that a packet processor may sometimes be referred to as a "network switch" (e.g., when implemented as a switch-on-a-chip). However, the term "network switch" is also commonly used to describe networking hardware, such as a switching hub, that may implement one or multiple packet processors as well as other hardware (such as discussed above with regard to networking device 200 in FIG. 2). Therefore, the term "packet processor" has been used herein to prevent confusion when referring to dedicated hardware for performing packet forwarding.

Packet processor 250 may implement multiple processing pipelines to output a processed network packet. For example, as illustrated in FIG. 3, ingress pipeline 302 and egress pipeline 304 may be implemented to provide forwarding of network packets as part of the data plane so that forwarding may be performed without software-based techniques. Ingress pipeline 302 may include different components, units, or stages, such as an ingress unit from a physical network interface 310, a packet parser 320, a packet buffer 330, packet metadata lookups 340, and scheduler 350. Ingress pipeline 302 may also access packet tables 350 and other packet routing information. Egress pipeline 304 may include a packet modifier 370 with access to other packet modification data, and an egress unit to physical network interface 390.

As data is received from network interfaces, ingress unit 310 may provide a physical layer (PHY) interface and Ethernet Media Access Control (MAC) layer interface. These interfaces may evaluate a stream of network data 312 (e.g., bit stream) received at packet processor 250 to detect valid streams and segment the stream into datagrams (e.g., packets/frames). For instance, the PHY layer may receive and transmit data across physical connections (e.g., such as electrical signals received over twisted pair or coaxial cable or optical signals received over optical fiber) at network interfaces 202. The PHY layer may implement different techniques dependent on the speed or type of network interface configured (e.g., Ethernet 10BASE-T, 100BASE-TX, and 1000BASE-T forms), such as encoding, multiplexing, synchronization, clock recovery and data serialization. Various signaling standards, such as IEEE 802.3, may govern the performance of the PHY layer consistent with the open systems interconnection (OSI) model for communications. The MAC layer may delimit frames and packets from the stream of data. Error checking may also be implemented at the MAC layer, checking for different errors, such as frame check sequence (FCS), inter-frame gap enforcement, and frame preambles.

Packet parser 320 may receive a network packet from ingress 310 and separate the packet header from the packet payload. The payload of the packet may be stored in packet buffer 330. Packet parser 320 may parse the packet header to determine and/or extract data for making a forwarding decision for the packet. For example, packet parser 320 may extract different layer headers (e.g., L2, L3, and L4 headers) included in an Internet Protocol (IP) version 4 packet, such as the source MAC address, the destination MAC address, the source IP address, the destination IP address, and port numbers. The extracted data may then be utilized to perform lookups to make forwarding decisions at packet forwarding engines 340.

Packet forwarding engines 340 may access data stored in packet tables 350 to make forwarding and tunneling decisions for the network packet based on information in the packet header (e.g., packet metadata) extracted by packet parser 320. For example, packet forwarding engines 340 may perform lookups for data in layer 2 (L2) portions of the packet to perform L2 forwarding. L2 forwarding may access a MAC address table in packet tables 350 perform two lookups (which may be in parallel). The first lookup may be performed with a key extracted from the packet header at packet parser 320 (e.g., a VLAN and source MAC address), to determine whether an entry for the packet is present in the MAC address table. If the source MAC address is unknown, then a mapping determination may be made to map the source MAC address to a port identified in the packet header. If the MAC address is known but attached to a different port than indicated in the MAC address table, then an operation may be performed to move the source MAC address to the port identified in the packet header. Otherwise the MAC address is known in the MAC address table. Another lookup to the MAC address table may also be performed with another key (e.g., the VLAN and the destination MAC address). The network packet may be routed if the MAC address table contains an entry for the destination MAC address owned by the networking device 200 (otherwise other operations may be performed, such as trapping the network packet for the CPU, bridging the packet out of a listed interface, or flooded out of all ports in an STP forwarding state).

Similarly, packet forwarding engines 340 may also perform lookups for data in layer 3 (L3) portions of the packet to perform L3 forwarding, in some embodiments. For example, internet protocol (IP) headers for the packet may be evaluated with respect to entries in tables, such as a routing or next hop table, to determine forwarding to be performed. Please note that the previous examples of packet forwarding engines 340 is not exhaustive, as many other forwarding decisions may be made, including, but not limited to, forwarding engines for spanning tree protocol (STP) state checking, access port virtual LAN (VLAN) handling, VLAN membership checking, MAC2ME lookup, broadcast/multicast forwarding to a host CPU for the switch (e.g., CPU(s) 230), tunnel start/termination lookup, source MAC lookup, learn filtering, learn requests, moved source MAC checking, multiprotocol label switching (MPLS) label lookups, traffic class mapping, time-to-live (TTL) checks, packet actions based on ingress/egress access control lists (ACL), and/or various other destination resolution lookups. As packet forwarding engines 340 make forwarding decisions about the packet (e.g., for L2, L3 and/or tunneling), the decisions are maintained as packet metadata. The packet metadata may be provided to scheduler 360 for scheduling determinations.

As discussed above, packet tables 350 may be implemented in one or multiple storage devices, such as various memory devices (e.g., a CAM, such as a TCAM, and/or random access memory) to store table data for performing different routing decisions. Tables may include a VLAN table, MAC address table, routing table, adjacency table, next hop table, tunnel start table, tunnel termination table, and/or actions table. Each of these different tables may be utilized to retrieve or determine packet forwarding decisions, tunneling decisions, and associated modifications that may need to be made to network packets.

Scheduler 360 may control the buffering of packets and scheduling of operations within packet processor 250. For example, scheduler 360 may implement a memory management unit to allocate available memory segments in packet buffer 330 to store packets to be buffered. If a packet needs to be buffered (e.g., because the egress interface is congested), scheduler 360 may store the packet in a private pool of memory assigned to a particular physical interface port for the packet or shared pools of memory to store packets (e.g., if the private pool of memory is full). Scheduler 360 may also implement a memory management unit to dequeue packets from packet buffer 330 for final processing and egress. Scheduler 360 may provide the appropriate metadata for a packet to modifier 360. Although not illustrated in FIG. 3, packets from packet buffer 330 and packet metadata from scheduler 360 may be moved from ingress pipeline 302 to egress pipeline 304 via a crossbar. A crossbar may, for example, be implemented by one or more destination rings to transmit a network packet from the ingress pipeline 302 via egress pipeline 304 to a desired destination port.

Network packets that have passed through ingress pipeline 302 may be scheduled or released from packet buffer 330 for modification, reassembly and egress as part of egress pipeline 304. Packet modifier 370 may be implemented to modify packet headers based on the routing decisions made at the packet metadata determine by packet forwarding engines 340. For example, if tunneling is enabled for a packet, packet modifier 370 may create and insert the appropriate tunnel header in order to encapsulate at least a portion of the packet to implement a tunneling protocol. Packet modifier 370 may also perform modifications to other data in the packet header. Once the modified packet has been reassembled, egress unit to physical network interface 290 may utilize the physical layer (PHY) interface and the Ethernet Media Access Control (MAC) layer interface to transmit network packets as network data 392 via the appropriate physical connection (e.g., coaxial, twisted pair, or optical cable).

In addition to making forwarding decisions for network packets, and performing forwarding accordingly, packet processor 250 may be configured to enable or disable tracing for received network packets, identify those network packets with tracing enabled, modify network packets to include packet trace information, truncate tracing for a network packet, and/or capture trace information in a network packet. For example, ingress from physical network interface 310 (or one or more other components in packet processor 250), may evaluate a network packet to see if an indicator flag for network tracing is set. Different types of fields in the packet may be utilized which are not disruptive to forwarding decisions for a network packet, such as utilizing a field for the source MAC multicast bit, a field for the EtherType, or a reserved bit in IP header flags. If ingress from physical network interface 310 determines that tracing for the packet is enabled, then it may capture some trace information, such as a current timestamp indicating a time (as determined according to the time known to the packet processor) that the network packet was received at the packet processor (and/or other trace information, such as ingress buffer queue depth). The timestamp, along with any other metadata used to generate tracking information may be preserved along with other packet metadata (as discussed above).

In some embodiments, ingress from physical network interface 310 can perform other checks to determine whether packet tracing can be performed. For example, ingress from physical network interface 310 can determine whether additional packet trace information can fit into a network packet without exceeding the maximum transmission unit (MTU), which may describe the maximum length or size of network packet. If, for instance, trace information is 32 bytes long, then 32 bytes may be added to a current packet length (e.g., as may be specified in L2 packet length) to determine if trace information fits. If not, then ingress from physical network interface 310 may mark the packet as truncated (e.g., by setting a bit in the current trace information or generate metadata that indicates that the network packet should be marked as truncated). Ingress from physical network interface 310 may also check to see whether truncation for the network packet is already set. To locate packet trace information, in some embodiments, a magic number, or other identifier may be implemented which indicates the start of network trace information in the network packet. Note however, that other information, such as field offsets or other indications of packet trace information within the network packet may be included in the network packet to locate the packet trace information. Utilizing techniques, such as those noted above, may allow packet trace information to be implicitly discoverable or explicitly pointed to in the network packet. In some embodiments, ingress from physical network interface 310 may also check the integrity of the network packet (e.g., by checking the cyclic redundancy check (CRC) value included in the network packet).

Figure 4:
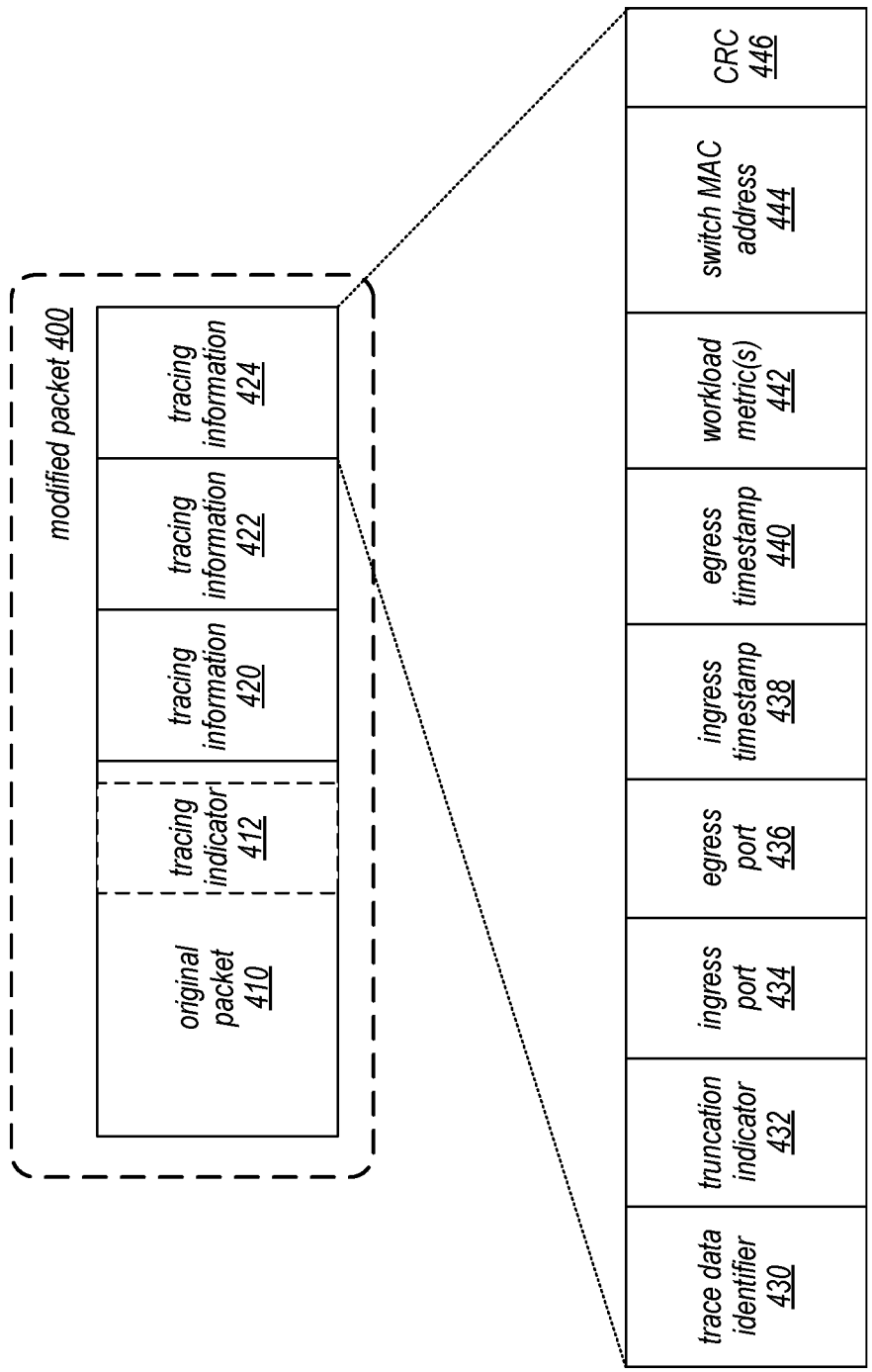
FIG. 4 is a logical block diagram illustrating a modified network packet that includes trace information, according to some embodiments.

Based on the various checks and determinations above, packet trace information may be included in the network packet (e.g., if the CRC is valid AND if new trace information will fit in the network packet AND if the network packet is not already truncated). Ingress from physical network interface 310 may provide an indication to packet buffer 330 that the truncation information may be included in the packet. When the network packet is released from packet buffer 330 to egress pipeline 304, packet buffer 330 may add blank bits equivalent to the size of trace information for the network packet (e.g., appending an additional 32 bytes to the network packet). Egress to physical network interface 390 may capture additional trace information, such as a timestamp indicating when the network packet was received at egress to physical network interface 390. Egress to physical network interface 390 may then write the captured trace information into the blank bits in the network packet. FIG. 4 is a logical block diagram illustrating a modified network packet that includes trace information, according to some embodiments.

Modified packet 400 may include packet information 410 received at the packet processor, which may be the original packet and any additional modifications to the packet made as a result of forwarding decisions (e.g., adding tunnel headers, etc.). Included in packet information 410 may be tracing indicator 412, which may indicate whether packet tracing is enabled or disabled for packet 410. One or multiple sets of trace information may be included in a network packet for different networking devices that have processed the network packet, such as trace information 420, 422, and 424.

Trace information may include various types of data. For example, trace information may include trace identifier 430. Trace data identifier 430 may be written to indicate the location of trace information implicitly or explicitly. For example, trace data identifier may be a magic number (e.g., a unique value) which indicates that information following the magic number is trace information. In some embodiments, trace data identifier 430 may include information that identifies the location of different values in the trace information (e.g., field length and offset values for truncation identifier 432, ingress port 434, egress port 436, ingress timestamp 438, egress timestamp 440, workload metric(s) 442, switch MAC address 444, and CRC 446). In this way, dedicated circuitry, such as packet processor 250, can determine the locations of individual data values in trace information and extract or read the data values as part of processing a network packet (e.g., at a packet processor implemented as part of an edge router, or a packet processor implemented as part of a network interface card that is an interface to the destination for the network packet).

Truncation indicator 432 may indicate whether trace information for the network packet is truncated. As trace information is added at different network hops along a route for a network packet, the trace information may grow. If the trace information would grow too large, the truncation indicator 432 may be set to indicate that trace information is included in the network packet but no additional trace information can be added. Ingress port 434 may describe the physical port via which the network packet is received. Egress port 436 may describe the physical port via which the network packet is sent. Ingress timestamp 438 may describe a timestamp for a time when the network packet is received and egress timestamp 440 may describe a time when the network packet is sent (e.g., when the network packet is received at egress to physical network 390). Note that timestamp values may be relative (e.g., current time as perceived at the packet processor) or absolute/synchronized between multiple networking devices in a network (e.g., synchronized via 1588 precision time protocol). Although not illustrated, in addition to (or instead of) timestamp values wait time or time spent processing indications may be included in the trace information. For example, the trace information may include an ingress timestamp and a wait time. Workload metric(s) 442 may include any information that describes the workload of the packet processor at a given time. For instance, workload metrics may indicate the buffer queue depth of the packet processor (which indicates the overall state of the packet processor as opposed to metrics specific to the processing of the network packet).

Switch MAC address 480 may identify the packet processor (e.g., a switch) as a location having processed the network packet. Egress to physical network interface 390 may also generate a new CRC value that includes all of the added data (e.g., 420-480) and write the new CRC value 490, as noted above. Please note that modified packet 400 in FIG. 4 is provided as an example and that numerous other arrangements for including trace information in a network packet may be performed.

In at least some embodiments, packet processors may be configured to enable or disable tracing for a received network packet. For example, packet forwarding engines 340 may include engines that determine particular actions for the packet (e.g., based on a source or destination IP address). An access control list (ACL) engine, for example, may utilize lookups to determine actions for particular network. These actions may include actions to enable or disable tracing for the received network packet. Packet metadata may be updated to indicate the action so that packet modifier 370 may write/update tracing indicator 412. Actions may also include indicators to capture or extract trace information in a received network packet. For example, another packet parser (not illustrated) may be implemented that extracts trace information in a received network packet by utilizing trace data identifiers 420 to locate and extract the trace information. In some embodiments, actions may indicate whether to trap the network packet to a controller (e.g., implemented as an application executing on general processor(s) 230 so that the controller can extract the trace information), log the network packet including the trace information to storage device for subsequent access and analysis (e.g., by a controller executing on general processor(s) 230), or mirror the network packet to another location (e.g., to system or device implementing a network monitoring system which can extract and analysis the trace information).

Figure 5:
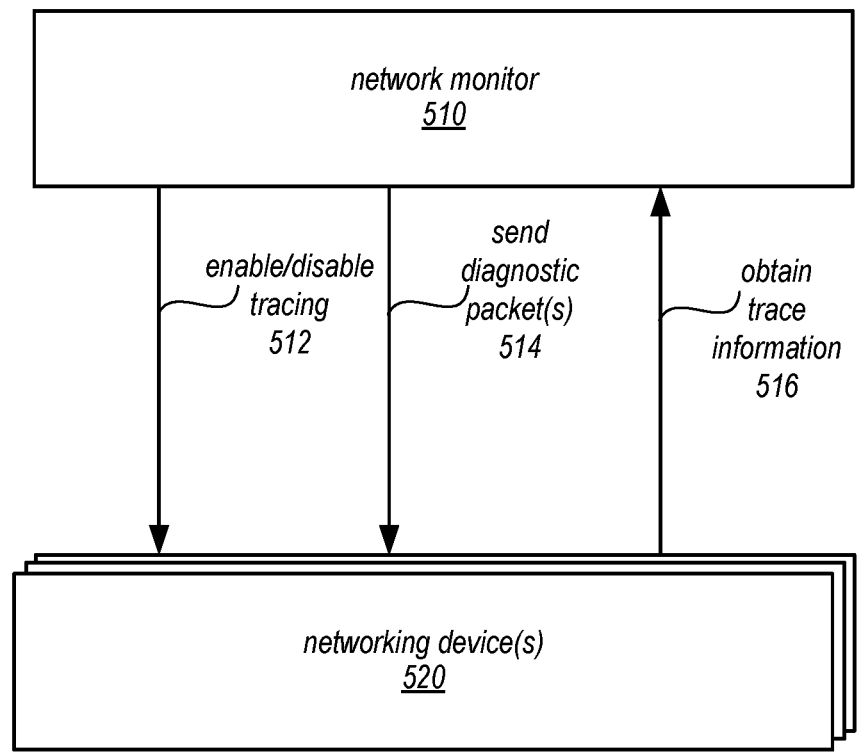
FIG. 5 is a logical block diagram illustrating interactions between a monitoring system and networking devices that implement network packet tracing, according to some embodiments.

Network packet tracing offers greater insight into the behavior of networking devices performing switching, routing, or other operations to facilitate network communications. Clients or hosts that utilize a network to facilitate communications can utilize trace information to understand how network traffic flows to particular locations. Moreover, entities that operate networks including networking devices can also gain greater understanding of the performance networking devices that facilitate network communications. Thus, it may be desirable to implement various kinds of monitoring or diagnostic tools that can take advantage of trace information included in network packets. FIG. 5 is a logical block diagram illustrating interactions between a monitoring system and networking devices that implement network packet tracing, according to some embodiments.

Network monitor 510 may be a standalone monitor or diagnostic application executing on a single computing system (e.g., computing system 1000 in FIG. 8 below) that may communicate with one or more networking device(s) 520. Alternatively, network monitor 510 may be a distributed system implemented across multiple computing systems that monitors a large number of networking devices 520. For example, as noted earlier networking devices may be implemented as part of a provider network that offers various computing services hosted on resources within the provider network. Network monitor 510 may performing network monitoring for networking devices implemented as part of the provider network (which may facilitate network communications between resources in the provider network and between systems or devices external to the provider network. Network monitor 510 may perform various analysis of trace information in order to detect unhealthy networking devices, suspicious network traffic, or any other form of passive or active network monitoring. Although not illustrated, network monitor may notify appropriate stakeholders (e.g., network providers, clients, or hosts) concerning particular network events, scenarios, or failures detected.

In at least some embodiments, networking monitor 510 can send instructions or requests to networking devices to enable or disable tracing 512 for all, some, or particular network packets. For instance, a request may be made to a controller for a packet processor (e.g., a controller executing on general processor(s) 230 in a networking device) to configure an ACL entry in the packet processor for network packets received from a particular IP address to perform an action to enable tracing on network packets received from the particular IP address. Similarly, a request may be made to disable tracing for all packets at networking device. In some embodiments, networking monitor 510 may perform requests to enable or disable tracing behalf of entities transmitting the network packets. For example, network monitoring 510 may be implemented as part of a provider network that implements a programmatic (e.g., an application programming interface (API)) and/or graphical user interface (GUI) that allows a user to request tracing be enabled or disable for network traffic associated with a particular customer account or resource(s) in the provider network. Tracing may be enabled, for instance, on network packets sent from a customer's virtual computing resource in the provider network to a customer's storage resource in the provider network. Network monitor 510 may collect, analyze and report to customers based on collected trace information for the request account or resources.

In some embodiments, network monitor 510 may be configured to send diagnostic packets 514 in order to perform various analyses of networking device(s) 520. These diagnostic packets may be sent with tracing enabled so as to collect trace information for networking device(s) and identify unhealthy networking device(s). In at least some embodiments, a tracing indicator included in a network packet may identify which trace information may be collected (e.g., specifying particular metrics to collect or not collect).

Network monitor 510 may also obtain trace information 516 from networking device(s) 520. For example, networking devices 520 may be configured to mirror network packets when a network packet is changed from tracing enabled to tracing disabled to network monitor 510 so that network monitor 510 may extract the trace information from the network packet. In some embodiments, an agent or application executing on networking devices may access trapped or logged network packets and extract trace information and then report the trace information to network monitor 510.

The examples of network packet tracing as discussed above with regard to FIGS. 2-5 have been given in regard to a packet processor implemented as part of a networking device. Note that various other types or configurations of networking devices that implement packet processors or devices with packet processing pipelines may implement these techniques. Moreover, different configurations of the various modules, components, or stages within a packet processor may implement network packet tracing. In addition to examples given above, the techniques discussed below with regard to FIGS. 6-7 may be also implemented using the various components discussed above as well as different types of systems or devices that perform packet processing.

Figure 6:
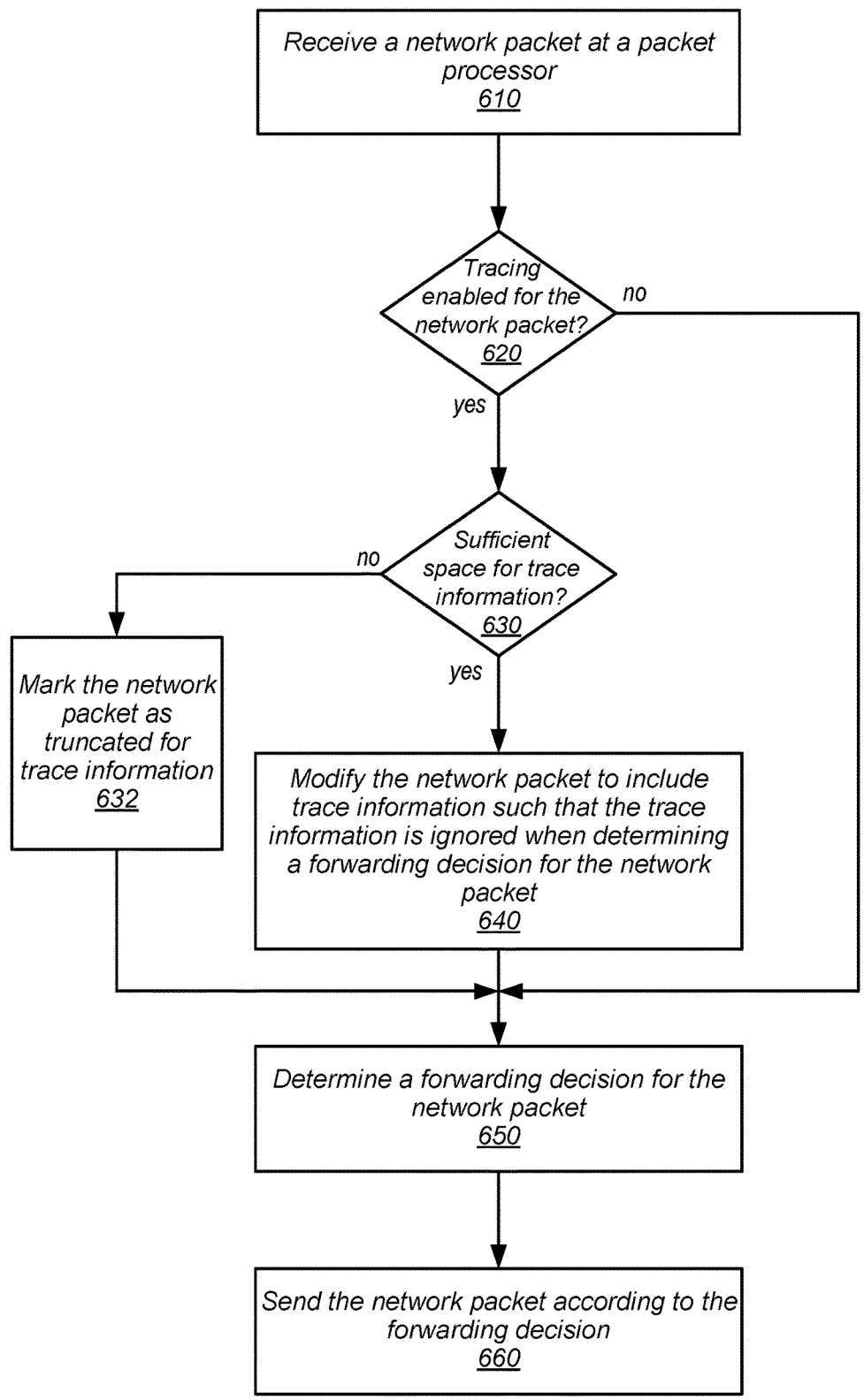
FIG. 6 is a high-level flowchart illustrating various methods and techniques to implement modifying network packets to include trace information, according to some embodiments.

FIG. 6 is a high-level flowchart illustrating various methods and techniques to implement modifying network packets to include trace information, according to some embodiments. As indicated at 610, a network packet may be received at a packet processor. Network packets may be a discrete portion of the stream of data transmitted over various types of network connections, such as twisted pair connections, coaxial connections, or fiber optic connections, or other wired or wireless connections formatted according to various transmission protocols. In at least some embodiments, network packets may be a unit of data according to layer 3, the network layer, of the open systems interconnection (OSI) model for communications. Layer 3 protocols may include protocols such as IP, internet control message protocol (ICMP), IP security (IPsec), routing information protocol (RIP), and many others. Note that different packet modifications, however, may be inserted to encapsulate data at differing levels of the OSI model, such as layer 2, layer 2.5, layer 3, and layer 4.

A determination as to whether tracing is enabled for the network packet may be made, as indicated at 620. For example, an indicator may be included in the network packet itself which identifies that tracing is enabled for the network packet. The indicator may be located in the network packet in a non-disruptive location so that other forwarding decisions for the network packet are not affected. For example, a reserved field in the IP header of the network packet could be set, the source MAC multicast bit could be set, or a change could be detected in the EtherType field. In some embodiments, the packet processor may have sufficient information to determine whether tracing is enabled by accessing a lookup table (e.g., utilizing an ACL forwarding engine) for an entry that corresponds to the network packet. If tracing is not enabled, then as indicated by the negative exit from 620, then forwarding of the network packet may continue without including trace information.

In at least some embodiments, a determination may be made as to whether sufficient space for trace information is available in the network packet, as indicated at 630. To determine whether sufficient space is available, the size of trace information may be added to the current size of the network packet (e.g., which can be determined by accessing packet header information). If the combined size is less than the MTU, then trace information may be included. If not, as indicated by the negative exit from 630, then the network packet may be marked as truncated for trace information, as indicated at 632, and forwarding of the network packet may continue without including trace information. Alternatively (although not illustrated), in some embodiments, if insufficient space exists for trace information, trace information for one or more previous networking devices may be overwritten with trace information for the current packet processor (according to the techniques discussed at 640).

Trace information may be capture and/or generated for the network packet. Trace information, as noted above, may include an identification of the packet processor as a location in the route traveled by the network packet. Such identification may utilize a unique identifier for the packet processor, such as a MAC address. Additional trace information useful to determine the latency or delay of processing the packet at the packet processor may be captured. For example, timestamps for when the packet is received and sent may be recorded along with identifiers of the physical ports via which the network packet is sent and received. Other metrics, such as workload metrics indicating the buffer queue depth of the packet processor may be included (which indicate the overall state of the packet processor as opposed to metrics specific to the processing of the network packet).

The network packet may be modified to include trace information, as indicated at 640, such that the trace information is ignored when determining forwarding decisions for the network packet. For example, unutilized locations in the network packet may be identified used to store the trace information. In at least some embodiments, trace information may be appended to the network packet. In addition to storing the trace information, various updates to packet headers, such as lengths, error detection codes, or other information may that may be affected by including the trace information may also be performed so that no changes are made to the forwarding of the packet. Moreover, some networking devices may not be configured to perform network tracing as described herein, and thus the trace information may be safely ignored until added to be another networking device or removed from the network packet.

As indicated at 650, a forwarding decision may be made for the modified network packet. Various types of forwarding decisions (e.g., L2 or L3 forwarding) along with packet modifications for tunneling or other switching or routing techniques may be performed. Because the trace information is located in unobtrusive locations in the network packet, forwarding may ignore or otherwise be unaware of the additional trace information. As indicated at 660, the network packet may then be sent according to the forwarding decision.

Figure 7:
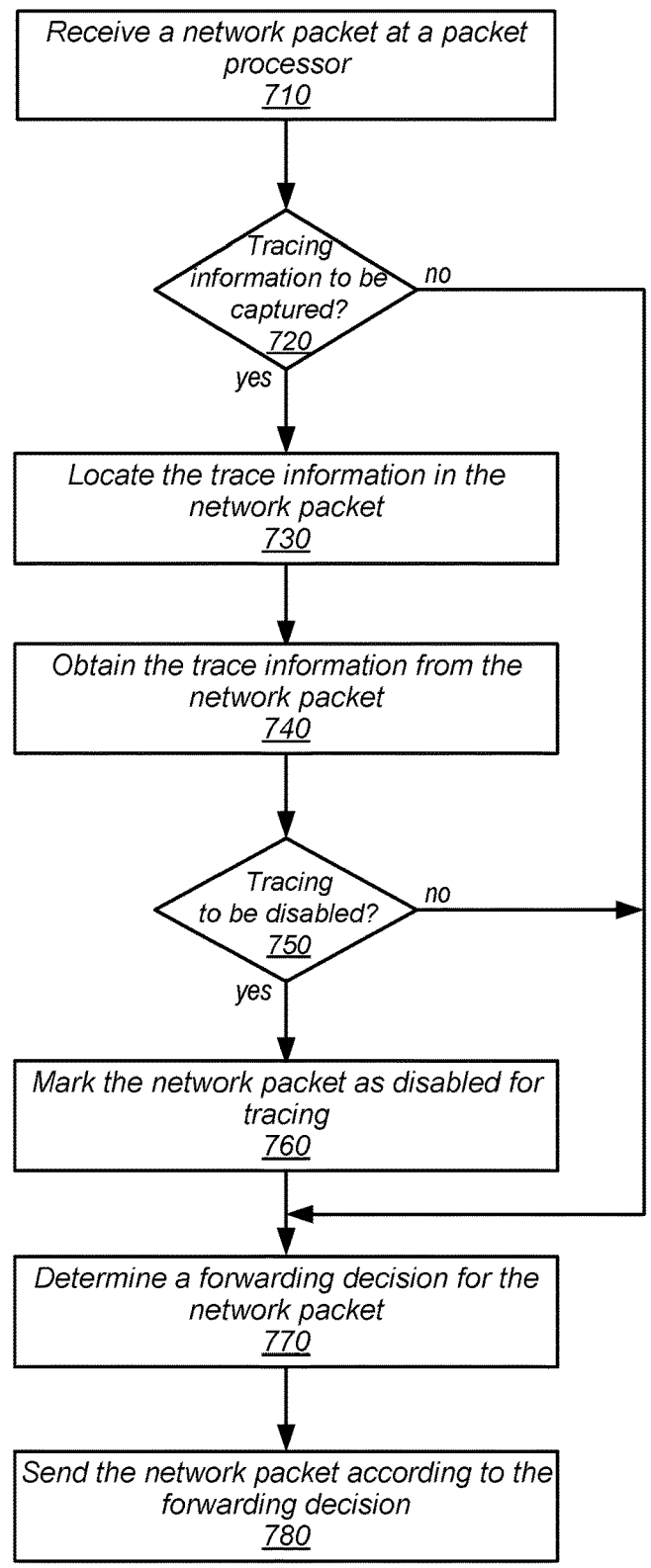
FIG. 7 is a high-level flowchart illustrating various methods and techniques to implement capturing trace information from network packets, according to some embodiments.

Trace information can accumulate as a network packet travels to multiple hops in a network. Capturing this trace information may be desirable at particular locations in the network. For instance, trace information may be captured at network boundaries, such as edge routers, in order to gather trace information indicative of the performance of the network (even if the network packet continues to travel outside of the network). FIG. 7 is a high-level flowchart illustrating various methods and techniques to implement capturing trace information from network packets, according to some embodiments.

As indicated at 710, a network packet may be received at a packet processor, in various embodiments. As indicated at 720, a determination may be made as to whether trace information is to be capture for the network packet, in some embodiments. For example, as noted above, a forwarding engine, such as an ACL engine, may determine actions associated with the network packet. One of the associated actions may include that trace information in the network packet is to be captured. If not indication is given that trace information is to be capture (as indicated by the negative exit from 720), then forwarding of the network packet may continue.

The trace information in the network packet may be located, as indicated at 730. For instance, the network packet may be read until a magic number is found that indicates that trace information follows after. In some embodiments, explicit location indications, such as field or offset values, may be utilized to access the appropriate location of the trace information. As indicated at 740, the trace information may be obtained from the network packet, in some embodiments. In some embodiments, the packet processor or packet processing pipeline may remove or extract the trace information in the hardware before providing the trace information to a controller or other system or component for analysis. In some embodiments, the network packet may be trapped, logged, or mirrored so that another system, component, or device may extract the trace information. Note that the techniques described at 730 and 740 may be performed multiple times according to the number of networking devices that have included trace information in the network packet.

A determination may be made as to whether tracing is to be disabled for the network packet, as indicated at 750, in some embodiments. As with determining whether trace information is to be captured, disabling tracing for a network packet may be determined by a forwarding engine or other component of a packet processor that can identify the action to disable tracing. In some embodiments, a network packet that has been trapped for a controller to extract trace information may allow the controller determine whether tracing is to continue for the network packet or be disabled. The controller may instruct the packet processor as to whether tracing should be disabled.

If, as indicated by the positive exit from 750, tracing is to be disabled, then the network packet may be marked as disabled for tracing, as indicated at 760. For example, a tracing identifier included in the network packet may be rewritten to indicate that tracing is not enabled. As indicated at 770, a forwarding decision for the network packet may be made, in some embodiments. For instance, though tracing may be disabled and trace information removed, the network packet may be sent on to other networking devices. The network packet may be sent according to the forwarding decision, as indicated at 780. Alternatively, the network packet may have reached its destination and be processed or may be dropped.

The various methods as illustrated in the figures and described herein represent example embodiments of methods. The order of any method may be changed, and various elements may be added, reordered, combined, omitted, modified, etc.

Figure 8:
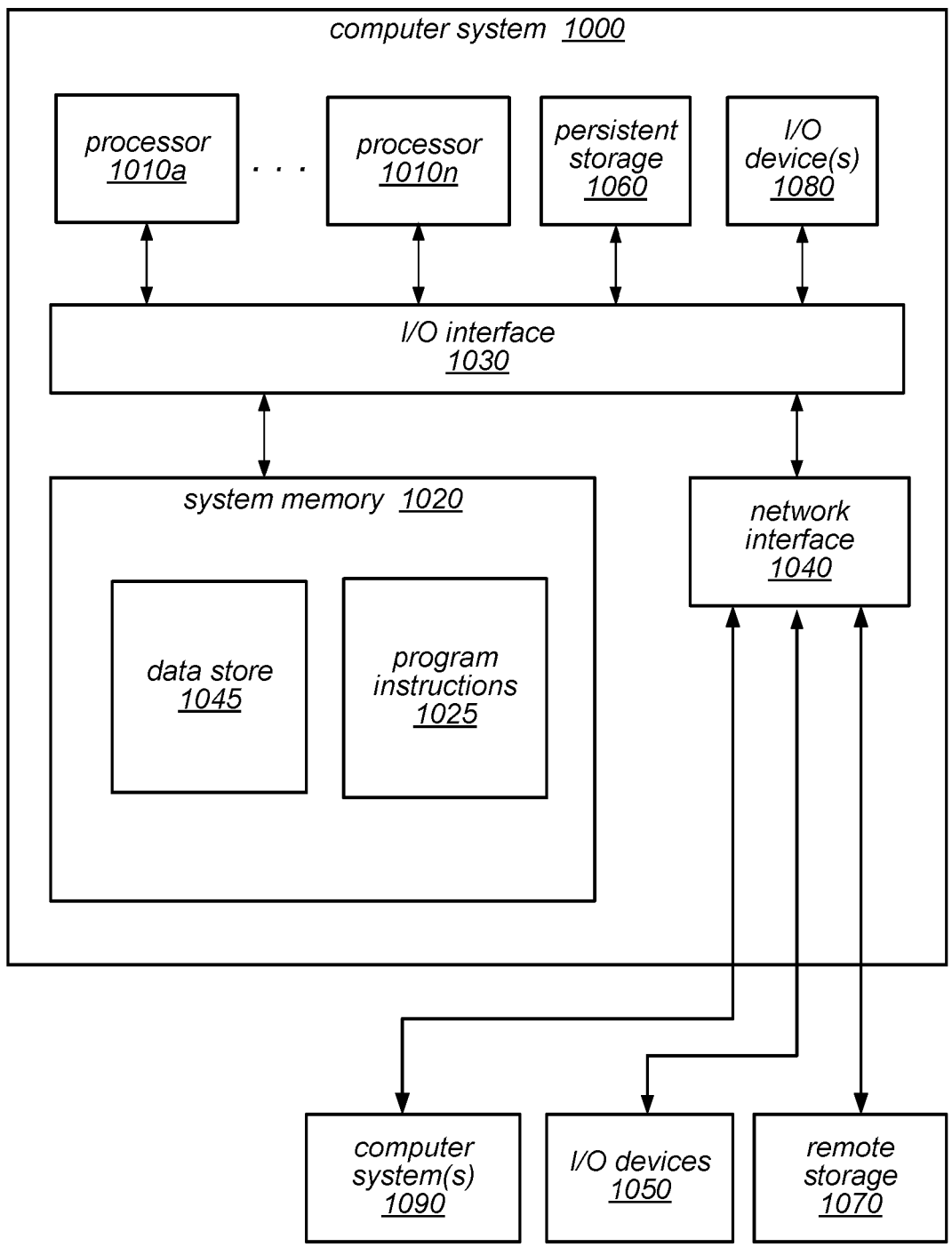
FIG. 8 is an example computer system, according to some embodiments.

Embodiments of a networking monitor, clients, servers, hosts, or other computing devices as described herein may be executed on one or more computer systems, which may interact with various other devices. FIG. 8 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A networking device, comprising:
a plurality of physical network interfaces; and
a packet processor, configured to:
   receive a network packet via one of the physical network interfaces;
   evaluate the network packet to determine that tracing is enabled for the network packet;
   generate trace information that identifies the packet processor as a location in a route traversed by the network packet;
   insert the trace information into the network packet to generate a modified network packet, wherein the insertion is performed such that the trace information that is inserted into the network packet is ignored when a forwarding decision is determined by the packet processor for the modified network packet;
   make a forwarding decision for the modified network packet that ignores the inserted trace information; and
   send the modified network packet via one of the physical interfaces according to the forwarding decision.

2. The networking device of claim 1, wherein to generate the trace information, the packet processor is configured to determine an ingress timestamp that indicates when the network packet was received at the packet processor and an egress timestamp that indicates when the network packet was sent from the same packet processor.

3. The networking device of claim 1, wherein to insert the trace information into the network packet, the packet processor is configured to:
   append the trace information to the network packet, wherein the trace information comprises a magic number to identify the trace information in the network packet; and
   update the network packet to include a cyclic redundancy check (CRC) for the network packet that includes the trace information appended to the network packet.

4. The networking device of claim 1, further comprising:
at least one processor; and
a memory, comprising program instructions that when executed by the at least one processor cause the at least one processor to implement a controller for the packet processor;
wherein the packet processor is further configured to:
   receive another network packet via one of the physical network interfaces;
   evaluate the other network packet to determine that trace information for the other network packet is to be captured;
   provide the other network packet to the controller;
wherein the controller is configured to:
   locate the trace information in the other network packet; and
   remove the trace information from the other network packet.

5. A method, comprising:
  receiving, at a packet processor, a network packet;
  determining, by the packet processor, that tracing is enabled for the network packet;
  in response to determining that tracing is enabled for the network packet:
    modifying, by the packet processor, the network packet to include trace information that identifies the packet processor as a location in a route traversed by the network packet, wherein the modification of the network packet is performed such that the trace information that is included in the network packet is ignored when determining by the packet processor a forwarding decision for the modified network packet;
    determining, by the packet processor, a forwarding decision for the modified network packet that ignores the inserted trace information; and
    sending, by the packet processor, the modified network packet according to the forwarding decision.

6. The method of claim 5, further comprising:
  determining, by the packet processor, at least one of:
    an ingress timestamp that indicates when the network packet was received at the packet processor; or
    an egress timestamp that indicates when the network packet was sent from the same packet processor; and
  wherein the ingress timestamp or the egress time stamp are included in the trace information in the modified network packet.

7. The method of claim 5, further comprising:
  determining, by the packet processor, a workload metric for the packet processor; and
  wherein the workload metric for the packet processor is included in the trace information in the modified network packet.

8. The method of claim 5, further comprising:
  receiving, at the packet processor, another network packet;
  determining, by the packet processor, that tracing is enabled for the other network packet;
  in response to the determining, evaluating, by the packet processor, the other network packet for sufficient space to include trace information that identifies the packet processor as a location in a route traversed by the other network packet;
  in response to determining that sufficient space is not available in the other network packet to include the trace information, updating the other network packet to indicate that tracing is truncated for the other network packet;
  determining, by the packet processor, a forwarding decision for the other network packet; and
  sending, by the packet processor, the other network packet according to the forwarding decision for the other network packet, wherein the other network packet does not include the trace information for the other network packet.

9. The method of claim 5, further comprising:
  receiving, at the packet processor, another network packet;
  determining, by the packet processor, that tracing is disabled for the other network packet;
  in response to determining that tracing is disabled, updating the other network packet to indicate that tracing is disabled;
  determining, by the packet processor, a forwarding decision for the other network packet; and
  sending, by the packet processor, the updated other network packet according to the forwarding decision for the other network packet.

10. The method of claim 5, further comprising:
  prior to receiving the network packet, updating, by a networking device, the network packet to indicate that tracing is enabled for the network packet.

11. The method of claim 10, wherein the packet processor is implemented as part of another networking device in a provider network that also includes the networking device, wherein the network packet is transmitted on behalf of a customer of the provider network from the networking device, wherein the updating of the network packet to indicate that tracing is enabled is performed in response to receiving a request to enable tracing of network traffic for the customer of the provider network via a programmatic interface for the provider network.

12. The method of claim 5, further comprising:
  receiving, at the packet processor, another network packet, wherein the other network packet includes trace information for one or more other networking devices that previously processed the other network packet;
  providing, by the packet processor, the other network packet to a network monitor; and
  performing, by one or more computing devices that implement the networking monitor:
    locating the trace information in the other network packet for the one or more other networking devices; and
    obtaining the trace information from the other network packet.

13. The method of claim 5, further comprising:
  receiving, at the packet processor, another network packet, wherein the other network packet includes trace information for one or more other networking devices that previously processed the other network packet;
  locating, by the packet processor, the trace information for the one or more other networking devices; and
  obtaining, by the packet processor, the trace information for the one or more other networking devices.

14. A system, comprising:
  a device configured to perform packet processing, the device comprising;
    one or more network interfaces configured to transmit and receive packets via a network connection to the device; and
    a packet processing pipeline, configured to:
      receive a network packet via one of the one or more network interfaces;
      evaluate the network packet to determine that tracing is enabled for the network packet;
      modify the network packet to include trace information that identifies the device as a location in a route traversed by the network packet, wherein the modification of the network packet is performed such that the trace information that is included in the network packet is ignored when making a forwarding decision by the packet processing pipeline for the modified network packet;
      make a forwarding decision for the modified network packet that ignores the inserted trace information; and
      send the modified network packet according to the forwarding decision via one of the network interfaces.

15. The system of claim 14, wherein the modification of the network packet is performed such that content included in the network packet when received remains unchanged.

16. The system of claim 14, wherein the packet processing pipeline is further configured to:
receive another network packet via one of the one or more network interfaces;
determine that tracing is to be enabled for the other network packet;
in response to the determination:
update the other network packet to indicate that tracing is enabled for the other network packet;
modify the other network packet to include trace information that identifies the device as a location in a route traversed by the network packet, wherein the modification of the other network packet is performed such that the trace information is ignored when making a forwarding decision for the other network packet;
make a forwarding decision for the modified other network packet; and
send the modified other network packet according to the forwarding decision for the modified other network packet via one of the network interfaces.

17. The system of claim 16, wherein to determine that tracing is to be enabled for the other network packet, the packet processing pipeline is configured to randomly select the other network packet out of a plurality of network packets received at the device for packet processing.

18. The system of claim 16, wherein to determine that tracing is to be enabled for the other network packet, the packet processing pipeline is configured to identify a matching access control list (ACL) rule that for the other network packet that indicates that tracing is to be enabled for the other network packet.

19. The system of claim 16, wherein to update the other network packet to indicate that tracing is enabled for the other network packet, the packet processing pipeline is further configured to modify one of:
a Multicast bit for a source Media Access Control (MAC);
a field for a EtherType; or
a reserved bit in Internet Protocol (IP) header flags.

20. The system of claim 14, wherein the packet processing pipeline is further configured to:
receive another network packet;
determine that tracing is enabled for the other network packet;
in response to the determination, evaluate the other network packet for sufficient space to include trace information that identifies the device as a location in a route traversed by the other network packet;
in response to a determination that sufficient space is not available in the other network packet to include the trace information, modify the other network packet to replace trace information that identifies one or more other devices to include the trace information that identifies the device;
make a forwarding decision for the other network packet; and
send the other network packet according to the forwarding decision for the other network packet, wherein the other network packet does not include the trace information for the other network packet.

21. The system of claim 14, wherein the packet processing pipeline is further configured to:
receive another network packet, wherein the other network packet includes trace information for one or more other networking devices that previously processed the other network packet;
remove the trace information for the one or more other networking devices;
evaluate the network packet to determine one or more packet characteristics;
make a forwarding decision for the other network packet; and
send the other network packet without the trace information according to the forwarding decision via one of the network interfaces.

22. The system of claim 21, wherein the trace information for the one or more other networking devices includes respective ingress and egress timestamps for the one or more other networking devices, and wherein the system further comprises one or more computing devices that implement a network monitor, the network monitor configured to:
receive the extracted trace information from the device; and
determine respective latencies for the one or more other networking devices according to the respective ingress and egress timestamps.

23. The system of claim 14, wherein the device is an application specific integrated circuit (ASIC), a system-on-chip (SoC), or a field-programmable gate array (FPGA).

* * * * *